(12) United States Patent
Luo et al.

(10) Patent No.: US 10,476,559 B2
(45) Date of Patent: Nov. 12, 2019

(54) APPARATUSES AND METHODS FOR ADAPTIVE SPATIAL DIVERSITY IN A MIMO-BASED SYSTEM

(71) Applicant: MICRON TECHNOLOGY, INC., Boise, ID (US)

(72) Inventors: Fa-Long Luo, San Jose, CA (US); Jeremy Chritz, Seattle, WA (US); Tamara Schmitz, Scotts Valley, CA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 40 days.

(21) Appl. No.: 15/600,420

(22) Filed: May 19, 2017

(65) Prior Publication Data
US 2018/0337710 A1 Nov. 22, 2018

(51) Int. Cl.
*H04L 27/06* (2006.01)
*H04B 7/0413* (2017.01)
*H04B 7/08* (2006.01)

(52) U.S. Cl.
CPC ......... *H04B 7/0413* (2013.01); *H04B 7/0848* (2013.01)

(58) Field of Classification Search
CPC ............................ H04B 7/0689; H04B 7/0615
See application file for complete search history.

(56) References Cited

U.S. PATENT DOCUMENTS

| | | | | |
|---|---|---|---|---|
| 6,952,454 | B1 * | 10/2005 | Jalali | H04L 5/023 375/260 |
| 6,999,538 | B2 | 2/2006 | Kung et al. | |
| 8,606,839 | B2 * | 12/2013 | Mugler | G06F 17/142 708/400 |
| 8,781,421 | B2 | 7/2014 | Elenes et al. | |
| 2007/0142089 | A1 * | 6/2007 | Roy | H04B 7/0848 455/562.1 |

(Continued)

FOREIGN PATENT DOCUMENTS

WO 2004021587 A1 3/2004

OTHER PUBLICATIONS

Fa-Long Luo et al. "An Antenna Diversity Scheme for Digital Front-End with OFDM Technology, 1998-2013 ZTE Corporation" (Year: 2011).*

(Continued)

*Primary Examiner* — Sithu Ko
(74) *Attorney, Agent, or Firm* — Dorsey & Whitney LLP (57) ABSTRACT

Examples described herein include apparatuses and methods to perform adaptive spatial diversity in a MIMO system. An example apparatus may include a plurality of receiving antennas and a wireless receiver configured to receive a respective plurality of receive signals each from a respective receiving antenna of the plurality of receiving antennas. The wireless signal may be further configured to apply a corresponding weight to each of the plurality of signals to provide a plurality of weighted signals and to apply an eigenfilter to the plurality of weighted signals provide a transfer function. The wireless receiver further configured to perform a fast Fourier transform (FFT) on the transfer function to provide output signals in the frequency domain.

19 Claims, 4 Drawing Sheets

(56) References Cited

U.S. PATENT DOCUMENTS

| | | | | |
|---|---|---|---|---|
| 2007/0258353 | A1 | 11/2007 | Okello | |
| 2010/0330946 | A1* | 12/2010 | Akkarakaran | H01Q 1/246 |
| | | | | 455/273 |
| 2011/0200089 | A1* | 8/2011 | Umeda | H04B 7/0854 |
| | | | | 375/232 |
| 2011/0289391 | A1* | 11/2011 | Breiling | H03M 13/2732 |
| | | | | 714/786 |
| 2012/0264388 | A1* | 10/2012 | Guo | H04B 7/0865 |
| | | | | 455/307 |
| 2016/0204969 | A1* | 7/2016 | Zhu | H04L 27/3405 |
| | | | | 375/261 |

OTHER PUBLICATIONS

International Search Report and Written Opinion for PCT application No. PCT/US2018/032756, dated Aug. 31, 2018, pp. all
Luo, Fa-Long et al., An Antenna Diversity Scheme for Digital Front-End With OFDM Technology, ZTE Corporation, 1998-2013, pp. 1-5 and figures 1, pp. 3-5.
First Office Action for TW Appl. No. 107117035 dated May 3, 2019, pp. all.

* cited by examiner

APPARATUSES AND METHODS FOR ADAPTIVE SPATIAL DIVERSITY IN A MIMO-BASED SYSTEM

BACKGROUND

There is interest in moving wireless communications to "fifth generation" (5G) systems. 5G promises increased speed and ubiquity, but methodologies for processing 5G wireless communications have not yet been set. Example 5G systems may be implemented using multiple-input multiple-output (MIMO) techniques, including "massive MIMO" techniques, in which multiple antennas (more than a certain number, such as 8 in the case of example MIMO systems) are utilized for transmission and/or receipt of wireless communication signals.

DETAILED DESCRIPTION

Certain details are set forth below to provide a sufficient understanding of embodiments of the present disclosure. However, it will be clear to one skilled in the art that embodiments of the present disclosure may be practiced without various of these particular details. In some instances, well-known wireless communication components, circuits, control signals, timing protocols, computing system components, telecommunication components, and software operations have not been shown in detail in order to avoid unnecessarily obscuring the described embodiments of the present disclosure.

Examples of an adaptive spatial diversity scheme for massive multiple input, multiple output (MIMO) system whose waveform is generated by any orthogonal frequency-division modulation (OFDM)-based modulation scheme and accesses technologies, such as generalized frequency division multiplexing (GFDM), filter bank multi-carrier (FBMC) transmission, universal filtered multi-carrier (UFMC) transmission, bi-orthogonal frequency division multiplexing (BFDM), spectrally efficient frequency division multiplexing (SEFDM), the faster-than-Nyquist signaling (FTN) based time-frequency packing (TFP). In comparison with the existing solutions, the described examples may exhibit improved performance with reduced computational complexity. That is, features of the proposed scheme may offer a better compromise among the performance; power consumption and complexity in the real-time implementation of the receiver of a massive MIMO based wireless system.

Figure 1:
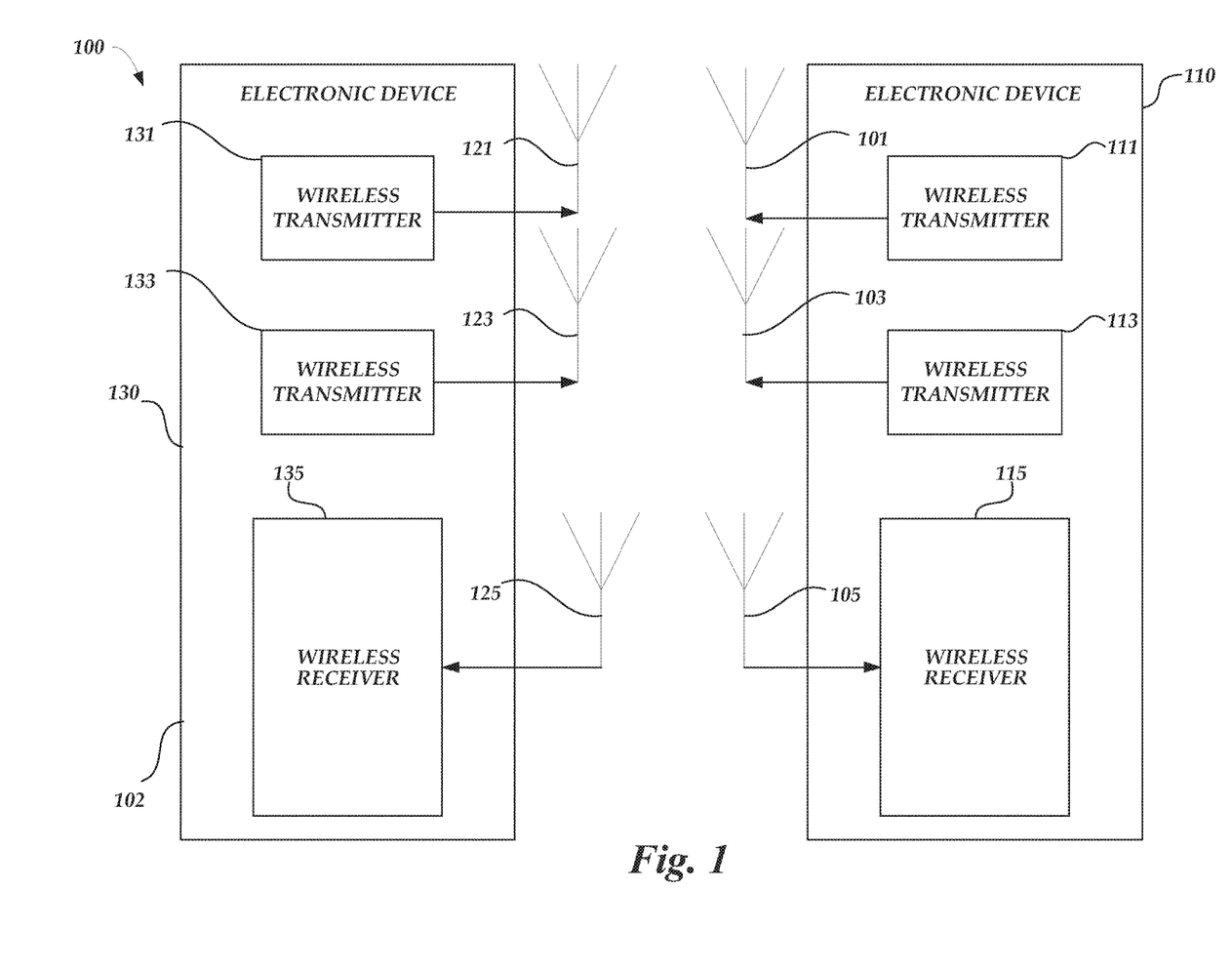
FIG. 1 is a schematic illustration of a system arranged in accordance with examples described herein.

FIG. 1 is a schematic illustration of a system arranged in accordance with examples described herein. System 100 includes electronic device 102, electronic device 110, antenna 101, antenna 103, antenna 105, antenna 121, antenna 123, antenna 125, wireless transmitter 131, wireless transmitter 133, and wireless receiver 135. The electronic device 102 may include antenna 121, antenna 123, antenna 125, wireless transmitter 131, wireless transmitter 133, and wireless receiver 135. The electronic device 110 may include antenna 101, antenna 103, antenna 105, wireless transmitter 111, wireless transmitter 113, and wireless receiver 115. In some examples, electronic devices 102, 110 may operate in a full duplex transmission mode between the respective antennas of each electronic device. In an example of a full duplex transmission mode, wireless transmitter 131 coupled to antenna 121 may transmit to antenna 105 coupled to wireless receiver 115, while, at the same time or during at least a portion of the same time, wireless transmitter 111 coupled to antenna 101 may transmit to antenna 127 coupled to wireless receiver 135, in some examples at a same frequency or in a same frequency band. In other examples, electronic devices 102, 110 may operate in a half-full duplex transmission mode between the respective antennas of each electronic device, where each electronic device only transmits or receives at a given point in time. Example implementations of wireless receiver 115 and/or wireless receiver 135 may use an adaptive spatial diversity scheme for a MIMO system whose waveform is generated by an OFDM-based modulation scheme.

Electronic devices described herein, such as electronic device 102 and electronic device 110 shown in FIG. 1 may be implemented using generally any electronic device for which communication capability is desired. For example, electronic device 102 and/or electronic device 110 may be implemented using a mobile phone, smartwatch, computer (e.g. server, laptop, tablet, desktop), or radio. In some examples, the electronic device 102 and/or electronic device 110 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 1, electronic device 102 and/or electronic device 110 may include any of a variety of components in some examples, including, but not limited to, memory, input/output devices, circuitry, processing units (e.g. processing elements and/or processors), or combinations thereof.

The electronic device 102 and the electronic device 110 may each include multiple antennas. For example, the electronic device 102 and electronic device 110 may each have more than two antennas. Four antennas each are shown in FIG. 1, but generally any number of antennas may be used including 2, 3, 4, 5, 6, 7, 8, 9, 10, 11, 12, 13, 14, 15, 16, 32, or 64 antennas. Other numbers of antennas may be used in other examples. In some examples, the electronic device 102 and electronic device 104 may have a same number of antennas, as shown in FIG. 1. In other examples, the electronic device 102 and electronic device 104 may have different numbers of antennas. Generally, systems described herein may include multiple-input, multiple-output ("MIMO") systems. MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 64) antennas to transmit and/or receive transmissions. As the number of antennas increase, so to generally does the complexity involved in accurately transmitting and/or receiving transmissions.

Although two electronic devices (e.g. electronic device 102 and electronic device 110) are shown in FIG. 1, generally the system 100 may include any number of electronic devices.

Electronic devices described herein may include receivers, transmitters, and/or transceivers. For example, the electronic device 102 of FIG. 1 includes wireless transmitter 131 and wireless receiver 135, and the electronic device 110 includes wireless transmitter 111 and wireless receiver 115. Generally, receivers may be provided for receiving transmissions from one or more connected antennas, transmitters may be provided for transmitting transmissions from one or more connected antennas, and transceivers may be provided for receiving and transmitting transmissions from one or more connected antennas. While both electronic devices 102, 110 are depicted in FIG. 1 with individual wireless transmitter and individual wireless receivers, it can be appreciated that a wireless transceiver may be coupled to antennas of the electronic device and operate as either a wireless transmitter or wireless receiver, to receive and transmit transmissions. For example, a transceiver of electronic device 102 may be used to provide transmissions to and/or receive transmissions from antenna 121, while other transceivers of electronic device 110 may be provided to provide transmissions to and/or receive transmissions from antenna 101 and antenna 103. Generally, multiple receivers, transmitters, and/or transceivers may be provided in an electronic device—one in communication with each of the antennas of the electronic device. The transmissions may be in accordance with any of a variety of protocols, including, but not limited to 5G signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (UFMC) transmission, bi orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards.

Examples of transmitters, receivers, and/or transceivers described herein, such as the wireless transmitter 131 and the wireless transmitter 111 may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

Figure 2:
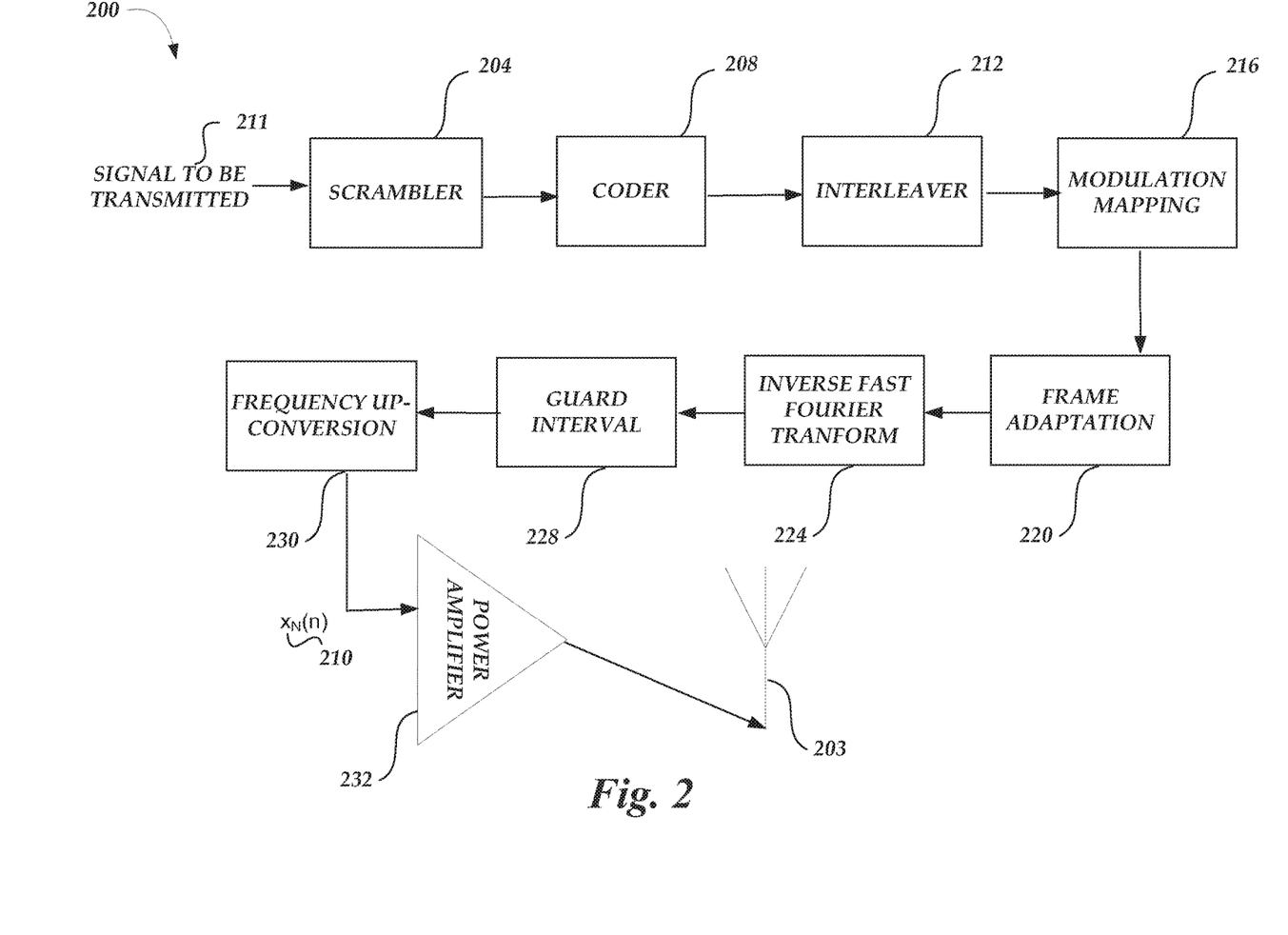
FIG. 2 is a schematic illustration of a wireless transmitter in accordance with examples described herein.

FIG. 2 is a schematic illustration of a wireless transmitter 200. The wireless transmitter 200 receives a signal to be transmitted 211 and performs operations of an RF-front end to generate wireless communication signals for transmission via the antenna 203. The wireless transmitter 200 may be utilized to implement the wireless transmitters 111, 113, 131, or 133 of FIG. 1, for example. The transmitter output data $x_N(n)$ 210 is amplified by a power amplifier 232 before the output data are transmitted on an RF antenna 236. The operations of the RF-front end may generally be performed with analog circuitry or processed as a digital baseband operation for implementation of a digital front-end. The operations of the RF-front end include a scrambler 204, a coder 208, an interleaver 212, a modulation mapping 216, a frame adaptation 220, an IFFT 224, a guard interval 228, and frequency up-conversion 230.

The scrambler 204 converts the input data to a pseudo-random or random binary sequence. For example, the input data may be a transport layer source (such as MPEG-2 Transport stream and other data) that is converted to a Pseudo Random Binary Sequence (PRBS) with a generator polynomial. While described in the example of a generator polynomial, various scramblers 204 are possible. The coder 208 may encode the data outputted from the scrambler to code the data. For example, a Reed-Solomon (RS) encoder or turbo encoder may be used as outer coder to generate a parity block for each randomized transport packet fed by the scrambler 204. In some examples, the length of parity block and the transport packet can vary according to various wireless protocols. The interleaver 212 may interleave the parity blocks output by the coder 208, for example, the interleaver 212 may utilize convolutional byte interleaving. In some examples, additional coding and interleaving can be performed after the coder 208 and interleaver 212. For example, additional coding may include an inner coder that may further code data output from the interleaver, for example, with a punctured convolutional coding having a certain constraint length. Additional interleaving may include an inner interleaver that forms groups of joined blocks. While described in the context of a RS coding, turbo coding, and punctured convolution coding, various coders 208 are possible, such as a low-density parity-check (LDPC) coder or a polar coder. While described in the context of convolutional byte interleaving, various interleavers 212 are possible.

The modulation mapping 216 modulates the data outputted from the interleaver 212. For example, quadrature amplitude modulation (QAM) can map the data by changing (e.g., modulating) the amplitude of the related carriers. Various modulation mappings may be possible, including, but not limited to: Quadrature Phase Shift Keying (QPSK), SCMA NOMA, and MUSA (Multi-user Shared Access). Output from the modulation mapping 216 may be referred to as data symbols. While described in the context of QAM modulation, various modulation mappings 216 are possible. The frame adaptation 220 may arrange the output from the modulation mapping according to bit sequences that represent corresponding modulation symbols, carriers, and frames.

The IFFT 224 may transform symbols that have been framed into sub-carriers (e.g., by frame adaptation 220) into time-domain symbols. Taking an example of a 5G wireless protocol scheme, the IFFT can be applied as N-point IFFT:

$$x_k = \sum_{n=1}^{N} X_n e^{j2\pi kn/N} \qquad (1)$$

where $X_n$ is the modulated symbol sent in the nth 5G sub-carrier. Accordingly, the output of the IFFT 224 may form time-domain 5G symbols. In some examples, the IFFT 224 may be replaced by a pulse shaping filter or poly-phase filtering banks to output symbols for frequency up-conversion 230. The guard interval 228 adds a guard interval to the time-domain 5G symbols. For example, the guard interval may be a fractional length of a symbol duration that is added, to reduce inter-symbol interference, by repeating a portion of the end of a time-domain 5G symbol at the beginning of the frame. For example, the guard interval can be a time period corresponding to the cyclic prefix portion of the 5G wireless protocol scheme. The frequency up-conversion 230 may up-convert the time-domain 5G symbols to a specific radio frequency. For example, the time-domain 5G symbols can be viewed as a baseband frequency range and a local oscillator can mix the frequency at which it oscillates with the 5G symbols to generate 5G symbols at the oscillation frequency. A digital up-converter (DUC) may also be utilized to convert the time-domain 5G symbols. Accordingly, the 5G symbols can be up-converted to a specific radio frequency for an RF transmission. Before transmission, at the antenna 203, a power amplifier 232 may amplify the transmitter output data $x_N(n)$ 210 to output data for an RF transmission in an RF domain at the antenna 236. The antenna 236 may be an antenna designed to radiate at a specific radio frequency. For example, the antenna 236 may radiate at the frequency at which the 5G symbols were up-converted. Accordingly, the wireless transmitter 200 may transmit an RF transmission via the antenna 236 according to the signal to be transmitted 211 received at the scrambler 204. As described above with respect to FIG. 2, the operations of the wireless transmitter 200 can include a variety of processing operations. Such operations can be implemented in a conventional wireless transmitter, with each operation implemented by specifically-designed hardware for that respective operation. For example, a DSP processing unit may be specifically-designed to implement the IFFT 224. As can be appreciated, additional operations of wireless transmitter 200 may be included in a conventional wireless receiver.

Figure 3:
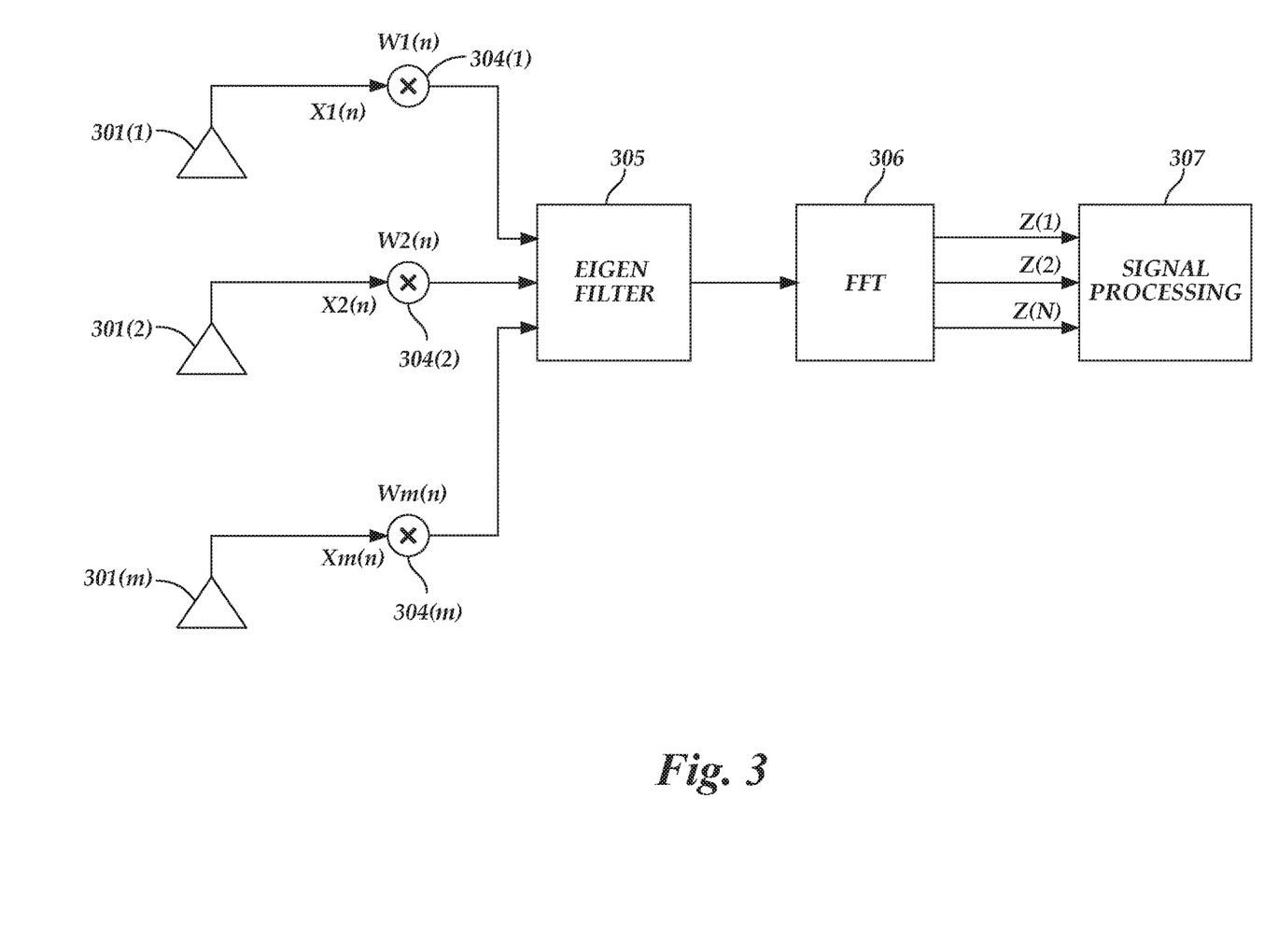
FIG. 3 is a schematic illustration of wireless receiver in accordance with examples described herein.

FIG. 3 is a schematic illustration of wireless receiver 300. The wireless receiver 300 receives input data X1(n)-Xm(n) via antennas 301(1-m), respectively, and performs operations of a RF wireless receiver to generate receiver output data at signal processor signal processors 307. The wireless receiver 300 may be utilized to implement the wireless receivers 115 or 135 of FIG. 1, for example. The antennas 301(1-m) may each be an antenna designed to receive at a specific radio frequency. The operations of the RF wireless receiver may be performed with analog circuitry or processed as a digital baseband operation for implementation of a digital front-end. The operations of the RF wireless receiver include multipliers 304(1-m) that combine the X1(n)-Xm(n) signals with respective weights W1(n)-Wm(n). It is noted that the "n" represents a specific frequency band in some examples. The weighted X1(n)-Xm(n) signals of each of the multipliers 304(1-m) may be provided to an eigenfilter 305. The eigenfilter 305 may apply eigenfiltering using eigenvectors to the weighted output signals to provide a transform function.

The transform function output of the eigenfilter 305 may be provided to the FFT 306, which may perform a Fourier transform to transition from the time domain to the frequency domain as the Z(1)-Z(N) signals. The Z(1)-Z(N) signals may be processed by the signal processors 307 in the frequency domain to recover data and other information received via the received X1(n)-Xm(n) signals.

In operation, each of the X1(n)-Xm(n) signals may be received signal in one of m channels, respectively, via the antennas 301(1-m). The multipliers 304(1-m) may combine (e.g., multiply) the X1(n)-Xm(n) signals with respective weights W1(n)-Wm(n). The weighted signal may be summarized to one-channel (e.g., one antenna's output). The weights may be selected to meet a predefined (e.g., optimized) criterion. In one example, the predefined criterion may include a maximum ratio combination (MRC) with which an optimized weight vector W(n)=[W$_1$(n), W$_2$(n), ... W$_M$(n)] may be obtained by the following equation:

$$W_{opt}(n) = E[X(n)^* y(n)] \quad (1)$$

where $X(n)=[X1(n), X2(n), \ldots XM(n)]$ and $y(n)=W^H(n) X(n)$, respectively, and where $W^H(n)$ is a conjugate transpose of W(n). By weighting the X1(n)-Xm(n) signals, a gain of 5-10% gain may be realized in bit-error reduction.

The weighted X1(n)-Xm(n) signals may be provided to the eigenfilter 305. In some examples, the eigenfilter 305 may include a finite impulse response (FIR) eigenfilter. The eigenfilter 305 may use eigenfiltering via eigenvectors to transform the weighted X1(n)-Xm(n) signals into a transform function to be used by the FFT 306 for conversion to the frequency domain. To calculate the eigenvectors, $W_E$, $X_h$, and $X_t$ represent the weight vector of the eigenfiltering, the sequence of head guided interval and the tailed part of the symbols, respectively. The $X_h$ and $X_t$ values may be based on information associated with signals expected to be received at the wireless receiver 300. The weight vector for the eigenvector may be obtained in such a way that an error is minimized when its norm is a constant (e.g., unity, for simplicity). That is:

$$\min_{W_E} E\|W^H X_h - W^H X_t\|^2 \quad (3.1)$$

$$St.\|W^H W\|^2 = 1 \quad (3.2)$$

According to the beamforming matrix theory, the solution of the above optimized problem may be the eigenvector (e.g., minor component) corresponding to a smallest eigenvalue of a correlation matrix R, which is:

$$E[(X_h-X_t)(X_h-X_t)^H] \quad (4)$$

In a practical implementation, the minor component of the eigenvector may be updated in the following adaptive algorithm:

$$W(t+1)=W(t)+\gamma s(t)(X_h-X_t-S(t)W(t)) \quad (5.1)$$

$$s(t)=W^H(t)(X_h-X_t) \quad (5.2)$$

where γ is a constant. The above-described algorithm may have the same complexity as that of a least mean squares (LMS) algorithm, and included multiplications may only be on the order of N multiplications.

Using the multipliers 304(1-M) and the eigenfilter 305, a count of unknown variables in the scheme is N+M, which is fewer than N*M unknown variables needed in the post-FFT scheme. Further, a single FFT 306 is needed, rather than M FFTs in a post-FFT scheme.

After producing the Z(1)-Z(N) signals, the signal processors 307 may perform further processing, such as synchronization, channel estimation, a demodulation mapping, de-interleaving, a decoding, and descrambling to retrieve data, commands, and other information from the X1(n)-Xm(n) signals.

Synchronization may detect pilot symbols in the 5G symbols to synchronize the transmitted data. In some examples of a 5G implementation, pilot symbols may be detected at the beginning of a frame (e.g., in a header) in the time-domain. Such symbols can be used by the wireless receiver 300 for frame synchronization. With the frames synchronized, the 5G symbols proceed to channel estimation. The channel estimation may also use the time-domain pilot symbols and additional frequency-domain pilot symbols to estimate the time or frequency effects (e.g., path loss) to the received signal. For example, a channel may be estimated based on N signals received through the antennas 401(1-*m*) in a preamble period of each of the X1(1)-Xm(n) signals. In some examples, the channel estimation may also use the guard interval that was removed at the guard interval removal. With the channel estimate processing, the channel estimation may compensate for the frequency-domain 5G symbols by some factor to minimize the effects of the estimated channel. While channel estimation has been described in terms of time-domain pilot symbols and frequency-domain pilot symbols, other channel estimation techniques or systems are possible, such as a MIMO-based channel estimation system or a frequency-domain equalization system. The demodulation mapping may demodulate the data outputted from the channel estimation. For example, a quadrature amplitude modulation (QAM) demodulator can map the data by changing (e.g., modulating) the amplitude of the related carriers. In some examples, the demodulation mapping may detect the phase of the carrier signal to facilitate the demodulation of the 5G symbols. The demodulation mapping 432 may generate bit data from the 5G symbols to be further processed by a deinterleaver.

The deinterleaver may de-interleave the data bits, arranged as parity block from demodulation mapping into a bit stream for a decoder. For example, a deinterleaver may perform an inverse operation to convolutional byte interleaving. The deinterleaver may also use the channel estimation to compensate for channel effects to the parity blocks. The decoder may decode the data outputted from the scrambler to code the data. For example, a Reed-Solomon (RS) decoder or turbo decoder may be used as a decoder to generate a decoded bit stream for a descrambler. For example, a turbo decoder may implement a parallel concatenated decoding scheme. While described in the context of a RS decoding and turbo decoding, various decoders are possible, such as low-density parity-check (LDPC) decoder or a polar decoder. The descrambler may convert the output data from decoder from a pseudo-random or random binary sequence to original source data. For example, the descrambler may convert decoded data to a transport layer destination (e.g., MPEG-2 transport stream) that is descrambled with an inverse to the generator polynomial of a scrambler. The descrambler thus outputs receiver output data.

As described above with respect to FIG. 3, the operations of the wireless receiver 300 can include a variety of processing operations. Such operations can be implemented in a conventional wireless receiver, with each operation implemented by specifically-designed hardware for that respective operation. For example, a digital signal processing (DSP) unit may be specifically-designed to implement at least the eigenfilter 305 and/or the FFT 306. As can be appreciated, additional operations of wireless receiver 300 may be included in a conventional wireless receiver.

Figure 4:
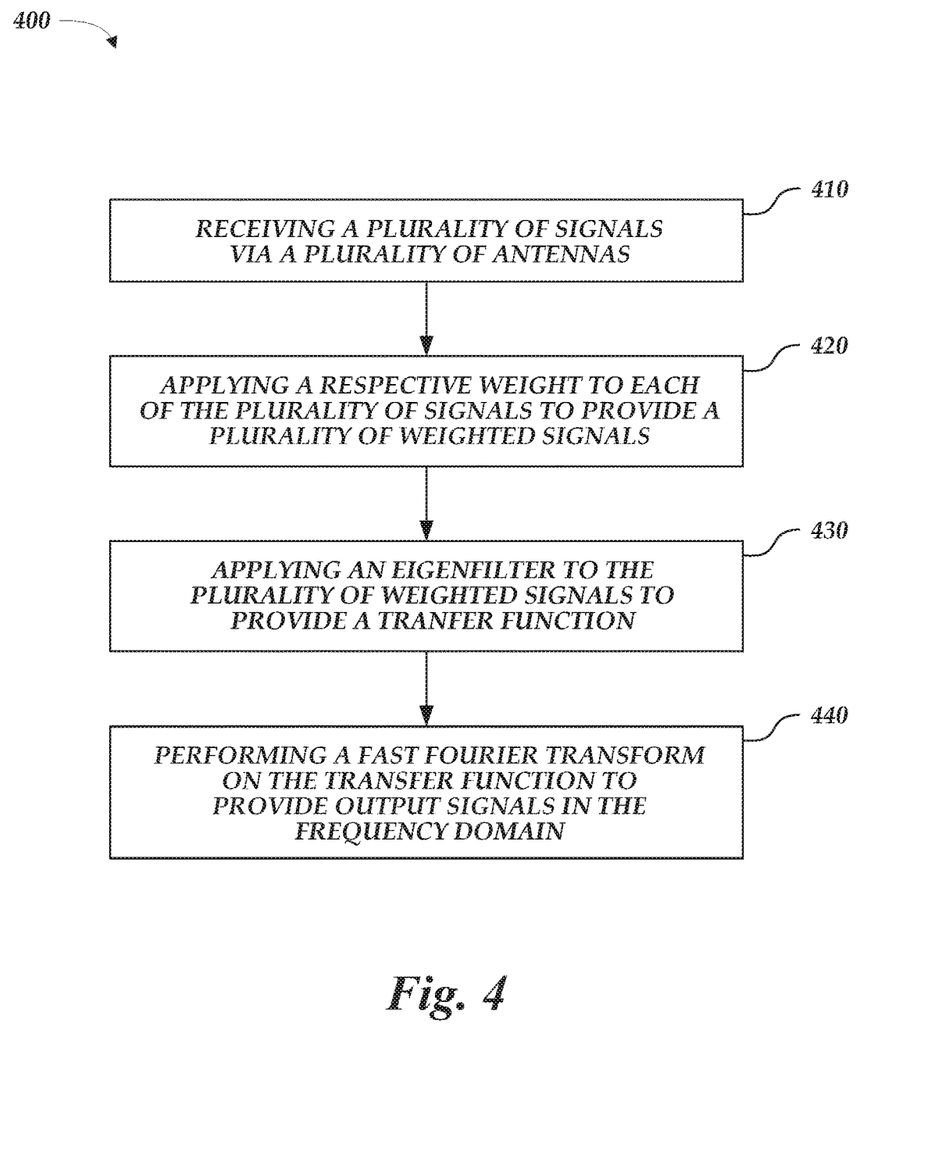
FIG. 4 is a flowchart of a method to process received signals in a MIMO system in accordance with examples described herein.

FIG. 4 is a flowchart of a method 400 to process received signals in a MIMO system in accordance with examples described herein. Example method 400 may be implemented using, for example, electronic device 102, 110 of FIG. 1, wireless receiver 300 of FIG. 3, or any system or combination of the systems depicted in FIGS. 1 and 3 described herein. The operations described in blocks 410-440 may also be stored as computer-executable instructions in a computer-readable medium.

The method 400 may include receiving a plurality of signals via a plurality of antennas, at 410. As an example, the plurality of antennas may include the antennas 102, 103, 105, 107 of the electronic device 110 of FIG. 1, the antennas 121, 123, 125, 127 of the electronic device 102 of FIG. 1, the antennas 301(1-*m*) of FIG. 3, or combinations thereof. The plurality of signals may include the X1(*n*)-Xm(n) signals of FIG. 3.

The method 400 may further include applying a respective weight to each of the plurality of signals to provide a plurality of weighted signals, at 420. Applying the respective weight may be via the multipliers 304(1-*m*) of FIG. 3. In some examples, the method 400 may further include providing a weight vector having weight coefficients selected to meet predefined criteria associated with expected receive signals. The respective weight may be included in the respective W1(*n*)-Wm(n) signals. In some examples, applying the respective weight to each of the plurality of signals includes combining individual coefficients of the weight vector with respective ones of the plurality of signals to provide the plurality of weighted signals.

The method 400 may further include applying an eigenfilter to the plurality of weighted signals provide a transfer function, at 430. The eigenfilter may include the eigenfilter 305 of FIG. 3. In some examples, applying the eigenfilter to the plurality of weighted signals includes applying eigenvectors to the plurality of signals to provide the transfer function. In some examples, the method 400 may further include determining weighted coefficients of the eigenvectors using a sequence of head guided interval and the tailed part of symbols. In some examples, applying the eigenfilter includes applying a finite impulse response filter to filter the weighted input signals. In some examples, the eigenvectors may be determined as described with reference to FIG. 3.

The method 400 may further include performing a fast Fourier transform (FFT) on the transfer function to provide output signals in the frequency domain, at 440. The FFT may be performed via the FFT 306 of FIG. 3. In some examples, performing the FFT is via a digital signal processor.

The blocks included in the described example method 400 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

From the foregoing it will be appreciated that, although specific embodiments of the present disclosure have been described herein for purposes of illustration, various modifications may be made without deviating from the spirit and scope of the present disclosure.

What is claimed is:

1. An apparatus comprising:
   a plurality of receiving antennas; and
   a wireless receiver configured to receive a respective plurality of receive signals each from a respective receiving antenna of the plurality of receiving antennas, the wireless receiver further configured to apply a corresponding weight to each of the plurality of receive signals to provide a plurality of weighted signals and to apply an eigenfilter to the plurality of weighted signals provide a transfer function, the wireless receiver further configured to perform a fast Fourier transform (FFT) on the transfer function to provide output signals in a frequency domain, wherein, using the output signals, the wireless receiver is further configured to perform an inverse operation to convolutional byte interleaving to de interleave data bits to retrieve transmitted data.

2. The apparatus of claim 1, wherein the wireless receiver includes the eigenfilter configured to apply eigenvectors to the plurality of signals to provide the transfer function.

3. The apparatus of claim 2, wherein the eigenfilter is configured to use a sequence of head guided interval and a tailed part of symbols of the plurality of signals to determine weighted coefficients of the eigenvectors.

4. The apparatus of claim 2, wherein the eigenfilter includes a finite impulse response filter to filter the plurality of weighted signals.

5. The apparatus of claim 1, wherein the wireless receiver includes a fast Fourier transform module to convert the transfer function from a time domain to the frequency domain.

6. The apparatus of claim 1, wherein the wireless receiver comprises a digital signal processor to perform the FFT.

7. The apparatus of claim 1, wherein the wireless receiver is configured to provide a weight vector having weight coefficients selected to meet predefined criteria associated with expected receive signals.

8. The apparatus of claim 7, wherein the wireless receiver further comprises multipliers configured to combine individual coefficients of the weight vector with corresponding ones of the plurality of signals to provide the plurality of weighted signals.

9. An apparatus comprising:
a plurality of receiving antennas each configured to receive a respective signal of a plurality of signals;
a plurality of multipliers coupled to respective ones of the plurality of receiving antennas, wherein each of the plurality of multipliers is configured to receive the respective signal of the plurality of signals associated with the respective one of the plurality of receiving antennas and to combine the respective signal with a respective coefficient of a weight vector to provide a respective weighted signal;
an eigenfilter configured apply an eigenvector to each of the respective weighted signals to provide a transfer function;
a fast Fourier transform (FFT) to transfer the transfer unction from a time domain to a frequency domain to provide output signals; and a signal processor configured to, using the output signals, perform an inverse operation to convolutional byte interleaving to de-interleave data bits to retrieve transmitted data.

10. The apparatus of claim 9, wherein the eigenfilter is configured to select coefficients for the eigenvector to minimize an error.

11. The apparatus of claim 9, wherein the FFT comprises a digital signal processor.

12. The apparatus of claim 9, wherein weight coefficients of the weight vector are selected to meet predefined criteria associated with expected receive signals.

13. A method comprising:
receiving a plurality of signals via a plurality of antennas;
applying a respective weight to each of the plurality of signals to provide a plurality of weighted signals;
applying an eigenfilter to the plurality of weighted signals to provide a transfer function; and
performing a fast Fourier transform (FFT) on the transfer function to provide output signals in a frequency domain; and
using the output signals, retrieving transmitted data by performing an inverse operation to convolutional byte interleaving to de-interleave data bits.

14. The method of claim 13, wherein applying the eigenfilter to the plurality of weighted signals includes applying eigenvectors to the plurality of signals to provide the transfer function.

15. The method of claim 14, further comprising determining weighted coefficients of the eigenvectors using a sequence of head guided interval and a tailed part of symbols of the plurality of signals.

16. The method of claim 14, wherein applying the eigenfilter includes applying a finite impulse response filter to filter the plurality of weighted signals.

17. The method of claim 13, wherein performing the FFT is via a digital signal processor.

18. The method of claim 13, further comprising providing a weight vector having weight coefficients selected to meet predefined criteria associated with expected receive signals.

19. The method of claim 18, wherein applying the respective weight to each of the plurality of signals comprises combining individual coefficients of the weight vector with respective ones of the plurality of signals to provide the plurality of weighted signals.

* * * * *